(12) United States Patent
Hur et al.

(10) Patent No.: US 9,807,056 B2
(45) Date of Patent: Oct. 31, 2017

(54) COMMUNICATION CHIPSET AND APPARATUS SECURE FROM INTERNET ATTACK

(71) Applicant: WIZnet Co., LTD., Gyeonggi-do (KR)

(72) Inventors: Bongjun Hur, Gyeonggi-do (KR); Wooyoul Kim, Seoul (KR); Soohwan Kim, Gyeonggi-do (KR); Jungtae Lee, Busan (KR)

(73) Assignee: WIZnet Co., LTD., Seongnam-si, Gyeonggi-do (KR)

( * ) Notice: Subject to any disclaimer, the term of this patent is extended or adjusted under 35 U.S.C. 154(b) by 147 days.

(21) Appl. No.: 14/881,168

(22) Filed: Oct. 13, 2015

(65) Prior Publication Data

US 2016/0344755 A1 Nov. 24, 2016

(30) Foreign Application Priority Data

May 22, 2015 (KR) .......................... 10-2015-0071510

(51) Int. Cl.
*H04L 29/06* (2006.01)
*H04W 4/00* (2009.01)
*H04W 12/08* (2009.01)

(52) U.S. Cl.
CPC ........ *H04L 63/0236* (2013.01); *H04L 63/162* (2013.01); *H04L 63/164* (2013.01); *H04W 4/008* (2013.01); *H04W 12/08* (2013.01)

(58) Field of Classification Search
USPC .......................................................... 726/23
See application file for complete search history.

(56) References Cited

U.S. PATENT DOCUMENTS

| 9,003,073 | B2* | 4/2015 | Kim | G06F 1/266 710/17 |
| 2004/0093513 | A1* | 5/2004 | Cantrell | H04L 12/2602 726/23 |
| 2008/0082695 | A1* | 4/2008 | Diab | H04L 12/10 709/250 |
| 2008/0192741 | A1 | 8/2008 | Lee et al. | |
| 2013/0107892 | A1* | 5/2013 | Rubin | H04L 69/22 370/474 |
| 2014/0351611 | A1 | 11/2014 | Kim et al. | |

FOREIGN PATENT DOCUMENTS

| KR | 10-0530856 | 11/2005 |
| KR | 10-1319981 | 10/2013 |
| KR | 10-1454879 | 11/2014 |

* cited by examiner

*Primary Examiner* — Jason Lee
(74) *Attorney, Agent, or Firm* — Revolution IP, PLLC

(57) ABSTRACT

A communication chipset and a communication apparatus are disclosed. A register map establishes a communication channel with a plurality of apparatuses, a first data link module sends/receives physical layer data of a first type and processes a data link layer in accordance with the first type, and a second data link module sends/receives physical layer data of a second type and processing a data link layer in accordance with the second type. Further, a first processing module is connected to the first data link module and the second data link module and filters out data link data from the first data link module and the second data link module by using setup data of a plurality of communication channels stored in the register map.

8 Claims, 5 Drawing Sheets

COMMUNICATION CHIPSET AND APPARATUS SECURE FROM INTERNET ATTACK

CROSS-REFERENCE TO RELATED APPLICATION(S)

This application is based on and claims priority to Korean Patent Application No. 2015-0071510, filed on May 22, 2015, the disclosure of which is incorporated herein in its entirety by reference.

TECHNICAL FIELD

The present invention relates to a communication chipset and a communication apparatus secure from Internet attacks, and more particularly to a communication chipset and a communication apparatus, in which a plurality of types of data link layers and network layers are supported, for filtering out packets built on each layer by using setup data in a plurality of layers, accordingly being secure from Internet attacks from external apparatuses through a communication network.

BACKGROUND

Devices (apparatuses) send/receive data each other through a communication network. Sending/receiving data through a communication network is generally implemented with various types of communication protocols in each layer of the OSI (Open System Interconnection) 7 Layer Model.

For example, an apparatus creates a TCP/UDP packet of a transport layer and then an IP (Internet Protocol) packet including the created packet of the transport layer to send/receive data to/from another apparatus through the Internet. Subsequently, the apparatus creates and then sends a packet of a data link layer including the IP packet to a wired or wireless transmission media through a physical layer (for example, a PHY chip). A receiving apparatus creates by reversing the order and then sends it to an application layer.

The OSI 7 Layer Model is processed generally by software because of its complicated architecture and various requirements in each layer. That is, apparatuses are equipped with a processor which extracts packets of the data link layer, (re) constructs the IP packet, and (re) constructs the TCP or UDP packet through the kernel program for processing the communication layer.

Layer packet processing by software enables an apparatus on one side to implement flexible layer packet processing and allows easy adaptation to various types or communication protocols and easy design change.

However, packet processing by software is exposed to various external attacks on communication. For example, it is essential that an apparatus may receive and process packets from external apparatuses through its equipped processor. Because hierarchical packet processing through layers is carried out by software, the concerned apparatus may fail to normally function due to various risks included in the packet. For example, the PC (Program Counter) of the processor may be changed by specific risk data included in the packet, causing processor to malfunction.

In addition, the apparatus may receive a plurality of packets sent from external random apparatuses. For example, a plurality of apparatuses may continue to send a plurality of packets to one target apparatus to make the target apparatus fail to normally function. The apparatus receiving the aforementioned packets has to process all of the packets continuously sent by software. This increases the load on the processor to make it fail to normally function.

On the contrary, an assumption is that the packets may be processed via hardware logic. As known from the registered patent which is filed and registered by the Applicant of the present invention (Registration No. 10-0530856, entitled "HIGH SPEED DATA PROCESSING COMMUNICATION METHOD AND APPARATUS FOR EMBEDDED SYSTEM," published for registration on Nov. 23, 2005 at KIPO), a specific communication protocol in a specific layer in the OSI 7 Layer Model may be processed via a hardware logic.

Communication packet processing via hardware logic may reduce the load on the processor equipped in an apparatus, and does not need an additional configuration of OS (Operating System) for the communication layer in the processor. As described above, communication packet processing via hardware logic provides some useful features.

It is also necessary that communication packet processing via hardware logic is prepared against external attacks through a communication network. Although hardware logics in each layer process packets without control by a processor and construct TCP packets, it is essential that the processor processes higher application data of a concerned TCP packet. As described above, packet processing via hardware logic may also be exposed to external attacks, and TCP packet processing consumes power.

Therefore, there is a need for a communication chipset and an apparatus for filtering out packets not required to process by a processor to make them secure from external attacks and reduce power consumption even at processing communication packets via hardware logic.

In addition, the architecture of a packet processing module with hardware logic is generally complex and it is thus not easy to insert a new processing module in a specific layer. In particular, if a new processing module is inserted in a data link layer, it is not easy to construct settings between the processing module in a lower layer and the processing module in a higher layer to make a hierarchical communication connection to other apparatuses. For example, if there is a plurality of data link layer processing modules, it is never easy to determine which data link layer is used or adapted in the process of establishing a socket.

Therefore, if there is a plurality of processing modules in a specific layer, there is a need for a communication chipset and an apparatus for establishing a communication connection to other apparatuses by linking the processing module of a higher layer to a plurality of processing modules in this specific layer.

SUMMARY

In view of the above, the present invention provides a communication chipset and a communication apparatus secure from Internet attacks by hierarchically building packets via hardware logic and filtering out the built packets in a plurality of layers.

Further, the present invention provides a communication chipset and a communication apparatus having dedicated hardware logic for tackling execution of attacker's code.

Further, the present invention provides a communication chipset and a communication apparatus for preventing unnecessary packets from being sent to higher layers in a way that packets are filtered out in each layer by using setup data established in a plurality of layers.

Further, the present invention provides a communication chipset and a communication apparatus for reducing power consumption required for processing packets by packet processing via a hardware logic and hierarchical packet filtering.

Further, the present invention provides a communication chipset and a communication apparatus for automatically identifying one of a plurality processing modules in a specific layer in establishing a communication channel.

Technical subjects of the present invention are not limited to the aforementioned technical subjects, and other technical subjects not described above will be apparent to those skilled in the art of the present invention from the following description.

In accordance with an embodiment of the present invention, there is provided a communication chipset, which includes: a register map configured to enable establishing a communication channel with a plurality of apparatuses; a first data link module configured to send/receive physical layer data of a first type and process a data link layer in accordance with the first type; a second data link module configured to send/receive physical layer data of a second type and process a data link layer in accordance with the second type; a first processing module connected to the first data link module and the second data link module, the first processing module being configured to filter out data link data from the first data link module and the second data link module by using setup data of a plurality of communication channels stored in the register map; a first network layer module configured to receive data link data outputted by the first processing module and process a specified network layer; a second network layer module configured to receive data link data outputted by the first processing module and process a network layer different from the first network layer module; and a second processing module connected to the first network layer module and the second network layer module, the second processing module being configured to filter out network layer data from the first network layer module and the second network layer module by using setup data of the plurality of communication channels stored in the register map.

Further, in accordance with another embodiment of the present invention, there is provided a communication apparatus, which includes a communication chipset; and a processor configured to send and receive data in an application layer through the communication chipset. In the embodiment, the communication chipset includes: a register map configured to enable establishing a communication channel with a plurality of apparatuses; a first data link module configured to send/receive physical layer data of a first type and process a data link layer in accordance with the first type; a second data link module configured to send/receive physical layer data of a second type and process a data link layer in accordance with the second type; a first processing module connected to the first data link module and the second data link module, the first processing module being configured to filter out data link data from the first data link module and the second data link module by using setup data of a plurality of communication channels stored in the register map; a first network layer module configured to receive data link data outputted by the first processing module and process a specified network layer; a second network layer module configured to receive data link data outputted by the first processing module and process a network layer different from the first network layer module; and a second processing module connected to the first network layer module and the second network layer module, the second processing module being configured to filter out network layer data from the first network layer module and the second network layer module by using setup data of the plurality of communication channels stored in the register map.

A set forth above, therefore, the communication chipset and the communication apparatus in accordance with the present invention are secure from Internet attacks by hierarchically building packets via hardware logic and filtering out the built packets in a plurality of layers.

In addition, the communication chipset and the communication apparatus in accordance with the present invention are constructed by using dedicated hardware logic to tackle execution of attacker's code.

In addition, the communication chipset and the communication apparatus in accordance with the present invention carry out filtering in each layer by using setup data established in a plurality of layers to avoid sending unnecessary packets to higher layers.

In addition, the communication chipset and the communication apparatus in accordance with the present invention carry out packet processing and hierarchical packet filtering via hardware logic to reduce power consumption required for packet processing.

In addition, the communication chipset and the communication apparatus in accordance with the present invention automatically identify one of a plurality of processing modules in a specific layer when establishing a communication channel.

The effect of the present invention is not limited to those described above, and other effects not described above will be apparent to those skilled in the art of the present invention from the following description.

DETAILED DESCRIPTION

The aforementioned objects, characteristics and advantages of the present invention will be apparent from the following description provided in detail with reference to the accompanying drawings, to help those skilled in the art understand the technical scope of the present invention. In addition, if a specific description of technology well known in the art in relation to the present invention is considered to make the gist of the present invention unnecessarily unclear while describing the present invention, the specific description is not provided. The embodiments in accordance with the present invention will be described in detail hereinafter with reference to the accompanying drawings.

Figure 1:
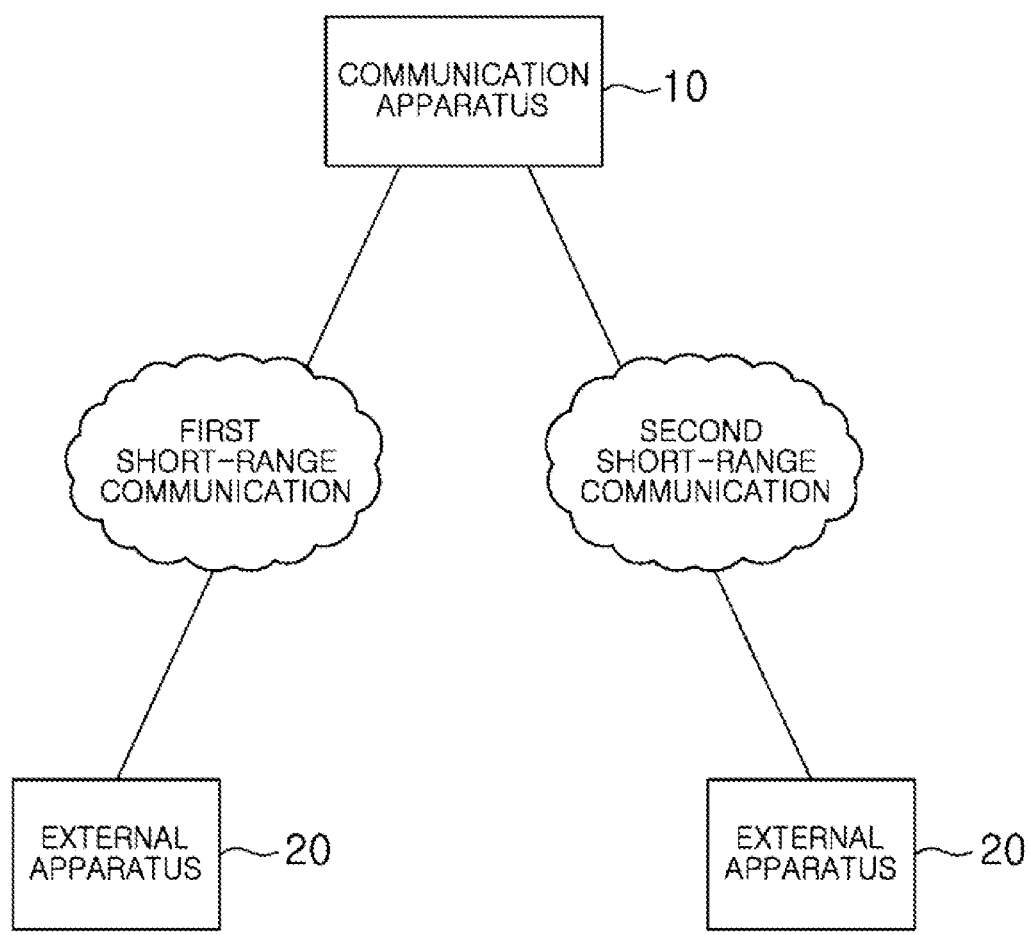
FIG. 1 is an exemplary block diagram of a communication system including a communication apparatus of the present invention.

FIG. 1 is an exemplary block diagram of a communication system including a communication apparatus 10 of the present invention.

Referring to FIG. 1, the exemplary communication system in accordance with the present invention includes a communication apparatus 10 and one or more external apparatuses 20. The communication apparatus 10 and the external apparatuses 20 of the present invention may be connected and send/receive data in compliance with the standards for short-range communications.

In the communication system shown in FIG. 1, the communication apparatus 10 is one capable of sending/receiving data in compliance with one or effectively a plurality of standards for short-range communications. For example, the communication apparatus 10 may send/receive data to/from the external apparatuses 20 with a wired connection thereto in compliance with the standards for short-range wired communications. In addition, the communication apparatus 10 may send/receive radio data to/from the external apparatuses 20 with a wireless connection thereto in compliance with the standards for short-range wireless communications. As described above, the communication apparatus 10 may be connected to short-range wired or wireless networks in compliance with a plurality of standards for short-range communications, as well as it may be in data communication with a specific external apparatus 20 in compliance with each of the standards for short-range communications.

The communication apparatus 10 in accordance with the present invention is described further in detail with reference to FIG. 2 and below.

The external apparatus 20 is an apparatus connected to the communication apparatus 10 and capable of sending/receiving data in compliance with a specified communication standard. The external apparatus 20 is connected to the communication apparatus 10 through a wireless media or a wired media.

For example, the external apparatus 20 may be connected to the communication apparatus 10 and send/receive radio data to/from the communication apparatus 10 in compliance with the ZigBee communication standard or the Bluetooth communication standard. In other cases, the external apparatus 20 may be connected to the communication apparatus 10 by wire and send/receive data to/from the communication apparatus 10 by wire in compliance with the Ethernet standard.

The external apparatus 20 is connected to the communication apparatus 10 through a short-range wireless or wired network, and the communication apparatus 10 supports two or more types of standards for short-range communications. For example, the communication apparatus 10 is connected to one or more specific external apparatuses 20 through a first short-range communication, and one or more specific external apparatuses 20 through a second short-range communication in compliance with a standard different from the standard for the first short-range communication to send/receive data each other.

The first short-range communication and the second short-range communication are defined at least as communication media and physical layer standards (protocols) and data-link layer standards, respectively. For example, the first short-range communication represents the Ethernet standards and the second short-range communication does specific standards of, for example, WiFi, ZigBee, or Bluetooth, etc.

Through the first short-range communication and the second short-range communication, the communication apparatus 10 may send/receive data to/from the external apparatus 20 of various communication types.

Figure 2:
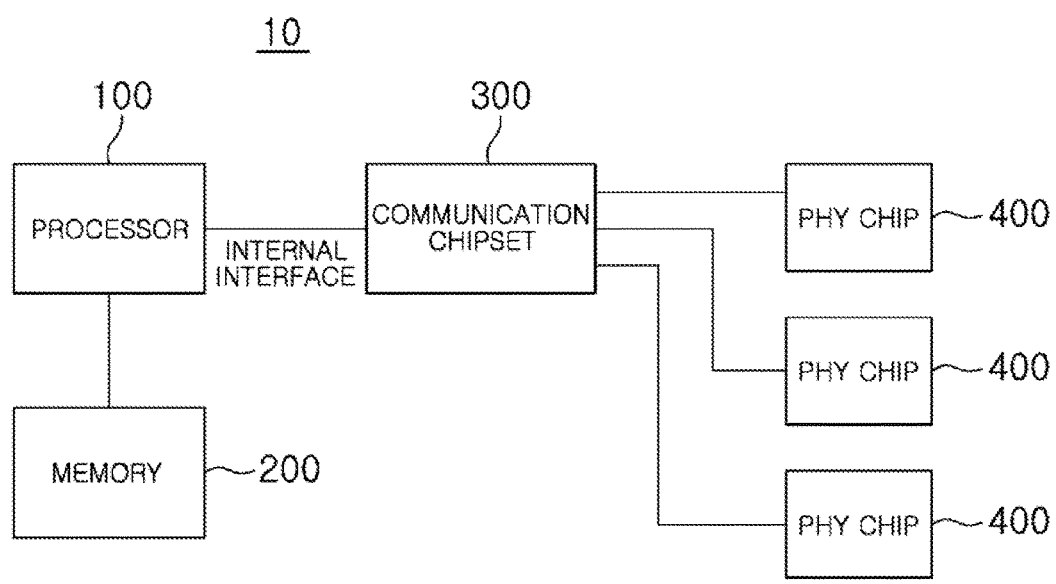
FIG. 2 is an exemplary block diagram of the communication apparatus.

FIG. 2 is an exemplary block diagram of the communication apparatus 10. The block diagram shown in FIG. 2 is a hardware block diagram.

Referring to FIG. 2, the communication apparatus 10 includes a processor 100, a memory 200, a communication chipset 300, and at least two PHY chips 400. Some of the components shown in FIG. 2 may be omitted depending on variant design. For example, one or more PHY chips 400 may be embedded in the communication chipset 300. In other cases, other components not shown in FIG. 2 may be further included in the communication apparatus 10. For example, the communication apparatus 10 may further include an interface for receiving user's input, a display for outputting images, a LED (Light Emitting Diode) for outputting signals, and/or a hard disk for storing files, and the like.

The processor 100 uses programs stored in the memory 200 to control the communication apparatus 10. The processor 100 is constructed to load programs to execute command codes of the programs. The processor 100 may also be referred to as a CPU (Central Processing Unit), MPU (Micro Processor Unit), or micro controller.

The processor 100 sends/receives data to/from the communication chipset 300 through an internal interface. The data sent/received between the processor 100 and the communication chipset 300 include the data sent to or received from an external apparatus 20 in compliance with the standards for short-range communications. Preferably, the data sent from the processor 100 to the communication chipset 300 are the data used in an application layer above the transport layer in the OSI 7 Layer Model. In addition, the data sent from the communication chipset 300 to the processor 100 are also the data used in an application layer.

While the processor 100 may access and control the communication chipset 300 through an internal interface, the processor 100 may select a specific register in the communication chipset 300 through the address bus of the internal interface and set setup values (data) in the concerned register.

The processor 100 may establish a plurality of communication channels by setting registers as described above. In particular, the processor 100 may establish communication channels with a plurality of external apparatuses 20 through at least two types of short-range communications. Communication channels are connected to the external apparatus 20 by using the setup values (data) of their corresponding configuration registers, respectively. Each of the communication channels is defined with the setup data representing a specific type in various types, and communication packets received through the first or the second short-range communication are filtered out in accordance with the present invention by using the setup data of the aforementioned type.

The internal interface may be, for example, a serial interface or a parallel interface. For example, the internal interface may be a serial interface, for example, a SPI (Serial Peripheral Interface Bus), UART (Universal Asynchronous Receiver/Transmitter), USB (Universal Serial Bus) and I2C (Inter-Integrated Circuit), or an 8-bit, 16-bit, 32-bit parallel bus arranged by the processor 100.

The memory 200 includes a volatile memory and/or a non-volatile memory. For example, the memory 200 includes one or more of volatile memories of DRAM type or non-volatile memories of NAND or NOR type.

The memory 200 stores programs and data. For example, the memory 200 stores programs for implementing communication in an application layer, and stores data to be sent or received files.

The communication chipset 300 is constructed to process a plurality layers in the OSI 7 Layer Model. For example, the communication chipset 300 is constructed to process the data link layer, the network layer and the transport layer. Since the communication chipset 300 may process packets from the transport layer to the data link layer, the processor 100 is constructed to process just application data to be actually sent and received with no need for processing each layer.

The communication chipset 300 is constructed to hierarchically process at least three succeeding layers. The communication chipset 300 may hierarchically filter out packets through data processing of layers in each operation. Hierarchical packet filtering is carried out by using registers configured for a plurality of communication channels.

Processing the data link layer, the network layer and the transport layer in the communication chipset 300 is implemented via hardware logic preferably. As described above, the communication chipset 300 may process each layer although programs are not executed by the processor 100.

Each layer processed by the communication chipset 300 is constructed to comply with a plurality of standard specifications. For example, the transport layer of the communication chipset 300 is constructed to process the TCP (Transmission Control Protocol), UDP (User Datagram Protocol) and ICMP (Internet Control Message Protocol). The network layer of the communication chipset 300 is constructed to process IPv4 (Internet Protocol version 4), IPv6 (Internet Protocol version 6) and ICMPv6 in parallel. In addition, the network layer may further include the BT (Bluetooth) adaptation layer to be interfaced with IPv6, or the 6LowPAN adaptation layer to be interfaced with 6LowPAN (IPv6 over Low power wireless Personal Area Networks). In addition, the data link layer is constructed to process Ethernet MAC (Media Access Control), WiFi MAC, 6LowPAN MAC, and BT MAC. By processing each MAC, physical layer data to be sent to the PHY chip 400 are created.

The PHY chip 400 is connected to the communication chipset 300 by wire, and sends/receives physical layer data through the wired connection. In addition, the PHY chip 400 encodes and sends the physical layer data received from the communication chipset 300 in compliance with the physical layer standards. For example, the PHY chip 400 encodes the data in compliance with the physical layer standards for Ethernet and then sends it by wire. In other cases, the PHY chip 400 encodes and sends the data at a specified frequency through an equipped antenna in compliance with the wireless communication standards.

One PHY chip 400 may be made to follow one standard for short-range communications, and another PHY chip 400 may be made to follow another standard for short-range communications. For example, one PHY chip 400 is in charge of processing physical layer signals in compliance with the first standard for short-range communications, and another PHY chip 400 is in charge of processing physical layer signals in compliance with the second standard for short-range communications.

The PHY chip 400 may be embedded in the communication chipset 300 depending on variant design.

Figure 3:
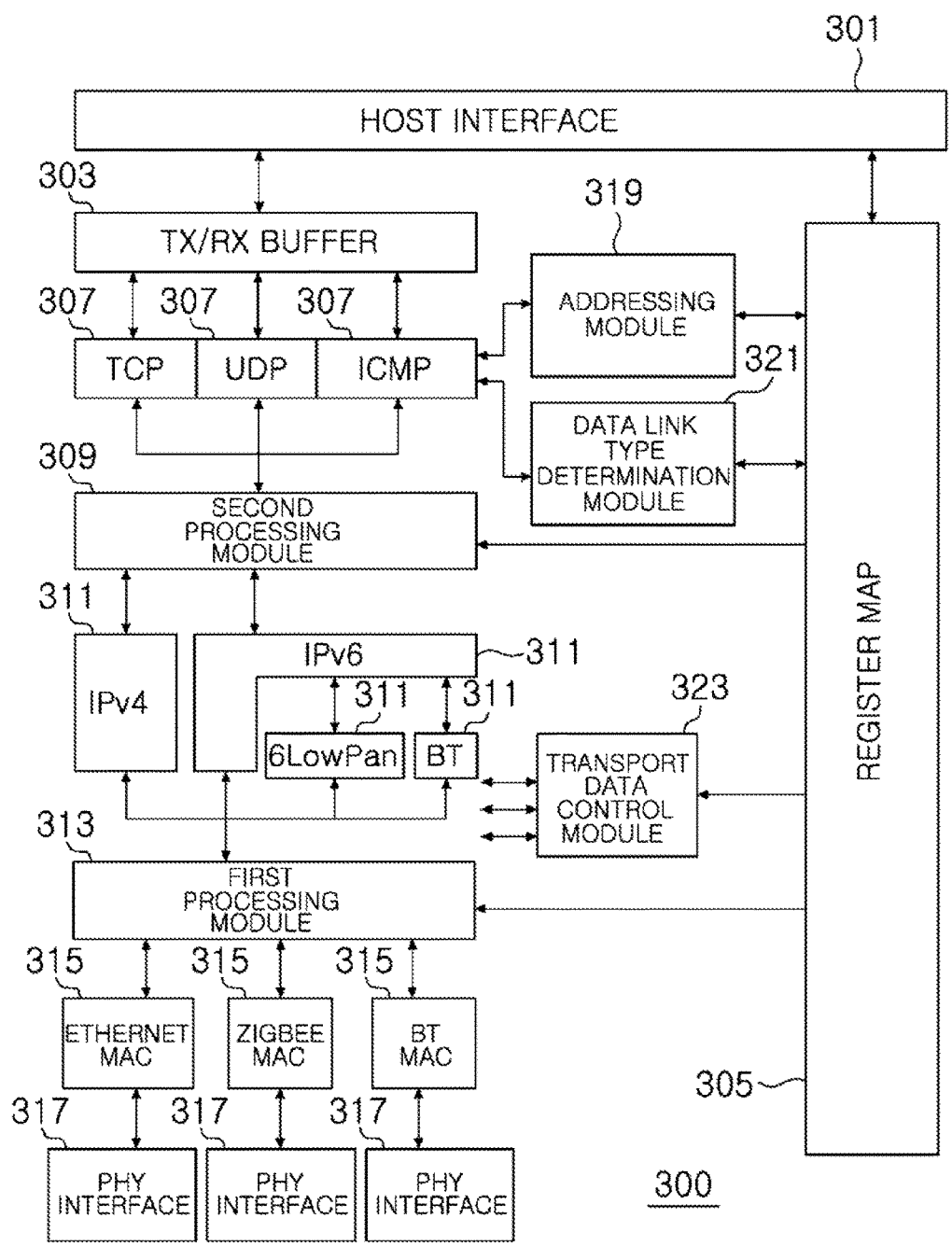
FIG. 3 is an exemplary hardware block diagram of a communication chipset.

FIG. 3 is an exemplary block diagram of hardware of the communication chipset 300. The block diagram of FIG. 3 shows a hardware logic implemented in the communication chipset 300 as blocks for functions and connections. The following description focuses on the architecture of filtering out unnecessary packets in an environment where a plurality of communication channels may be established.

Referring to the block diagram shown in FIG. 3, the communication chipset 300 includes a host interface 301, a TX/RX buffer 303, a register map 305, a plurality of transport layer modules 307, a second processing module 309, a plurality of network layer modules 311, a first processing module 313, a plurality of data link modules 315, one or more PHY interfaces 317, an addressing module 319, a data link type determination module 321, and a transport data control module 323. The communication chipset 300 shown in FIG. 3 is constructed with hardware logic and a variety of gate logics required for controlling the respective components.

The host interface 301 is logic for an interface with the processor 100. The host interface 301 is constructed to process the data and control signals of the internal interface equipped in the processor 100. The host interface 301 may interwork with the processor 100 to write specific data in a specific address or provide the data written in a specific address to the processor 100. For example, the host interface 301 may write or read in data (data in layers higher than the application layer) to be sent to the TX/RX buffer 303 through control by the processor 100, write setup data in and read the setup data into the register map 305.

The TX/RX buffer 303 is a buffer for storing the data in the application layer to be sent or received through short-range communications. The TX/RX buffer 303 provides the processor 100 with independent storage spaces as many as the number of communication channels that may be established and processed in the communication chipset 300. The communication channel may represent a channel established in an application layer higher than the transport layer, and, for example, a socket. As described above, the communication chipset 300 in accordance with the present invention may provide a plurality (for example, eight) of independent communication channels, and the processor 100 may write application data to be sent to the independent storage space of the TX/RX buffer 303 and read received application data therefrom.

The register map 305 stores setup data and status. In particular, the register map 305 enables a communication channel with the plurality of external apparatuses 20 to be established through short-range communications. Preferably, the register map 305 indicates or represents register set or register groups accessible by the processor 100.

Figure 4:
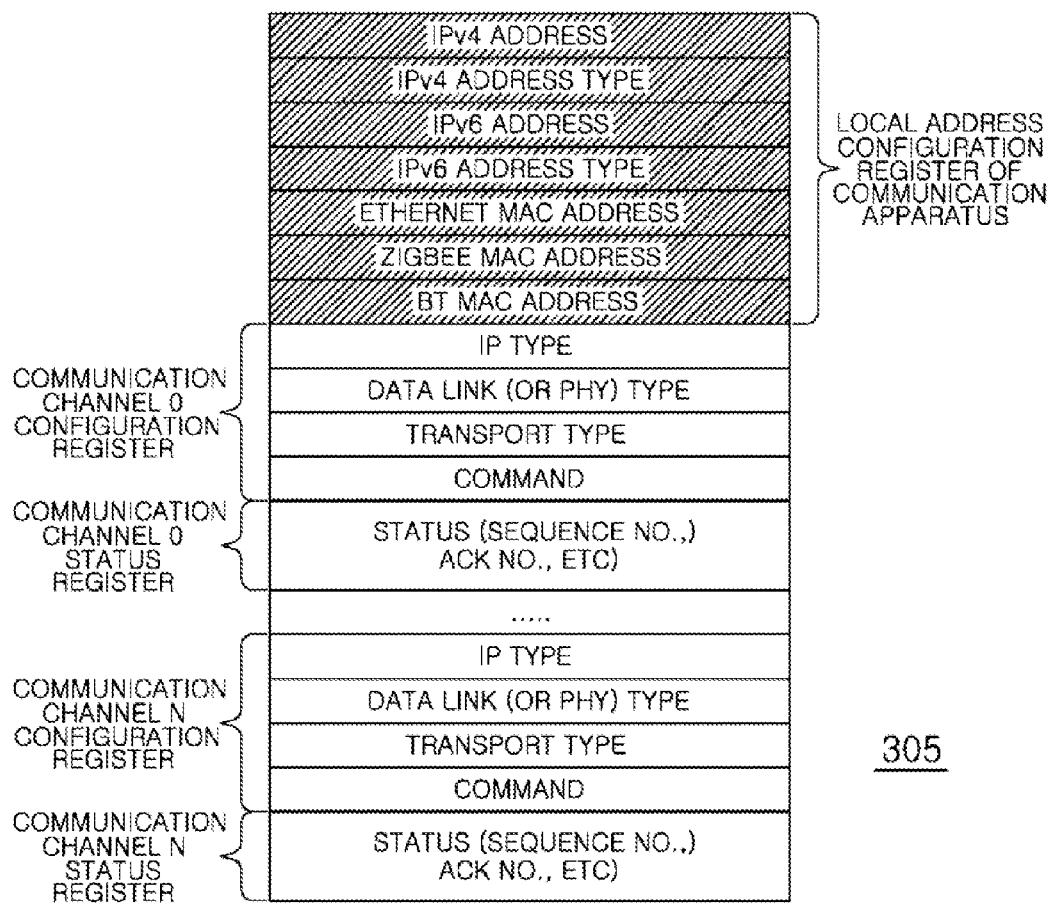
FIG. 4 shows an exemplary internal architecture of a register map showing registers required for establishing a communication channel.

FIG. 4 shows an exemplary internal architecture of the register map 305 showing registers required for establishing a communication channel. The processor 100 may write data in each register and access the register through the host interface 301.

As shown in FIG. 4, the register map 305 includes (an area of) a local address configuration register for configuring a local address of the communication apparatus 10. The register map also includes (areas of) communication channel registers that can control and monitor each of the communication channels provided by the communication chipset 300.

The local address configuration register may set the address in one or more network layers and the address in one or more data link layers. Preferably, the local address configuration register may include registers which may configure two or more network layer addresses and two or more data link layer addresses it supports.

For example, the local address configuration register may have an IPv4 address register and an IPv6 address register used as a register for configuring the network layer addresses and an Ethernet MAC address register, a ZigBee MAC address register and a BT MAC address register used as a register for configuring the data link layer addresses. A specific address may share the same register with other addresses. For example, an area for the lower three bytes of the Ethernet MAC address register may be the same as that of three bytes of the ZigBee MAC address register.

In addition, the local address configuration register further includes a register for configuring the type of each network layer address. For example, the local address configuration register includes the IPv4 address type register for specifying whether the IPv4 address is a fixed type or the DHCPv4 (DHCP (Dynamic Host Configuration Protocol) for IPv4) type. In addition, the local address configuration register includes the IPv6 address type register for specifying whether the IPv6 address is a fixed type, the DHCPv6 (DHCP for IPv6) or an auto configuration type. Two network addresses of one communication chipset 300, specifically, one communication apparatus 10, are set by the address type register.

As described above, the local address configuration register enables the communication apparatus 10 to configure two or more network layer addresses and/or two or more data link layer addresses.

The register map 305 includes (areas of) communication channel configuration registers for writing settings and statuses related to communication channels supported by the communication chipset 300. Each of the communication channel configuration registers corresponds to one communication channel.

The communication channel configuration registers contribute to establishing which type of layer is used among a plurality of layer types supported by the communication chipset 300, and further to monitoring the status of each communication channel. The communication channel configuration register includes a transport layer type register, a network layer type register and/or a data link (or PHY) layer type register. Depending on each type configured for the communication channel configuration register, a specific communication channel is specified and application data may then be sent/received.

For example, the transport layer type register may be configured in a type of TCP, UDP or ICMP. For example, the network layer type register may be configured in a type of IPv4 or IPv6. For example, the data link layer type register is configured as an Ethernet, ZigBee or Bluetooth type. In other cases, if it is impossible to set a data link layer type, the data link layer type register may be configured as automatic setup. A specific data link layer type may be identified by the communication chipset 300 in accordance with the automatic setup. This process will be discussed further below.

The communication channel configuration register also includes a command register. The command register is a register for controlling a concerned communication channel and may be written therein by the processor 100. The command register is constructed to write one or more command sets therein that may be used in an application layer. For example, the processor 100 may write commands, for example Open, Close, Send and Receive for the communication channel (socket) in the command register. The communication chipset 300 carries out specified functions to comply with the command register.

The communication channel configuration register further includes a status register for identifying the current status of a communication channel. The status register may identify whether the communication channel is open or closed, and store the status of a specific communication protocol of a layer for processing each communication channel. For example, the status register stores status, a sequence number and an ACK number of TCP. The TCP status may represent, for example, whether the communication channel is disconnected (ended), attempts to make a connection, is connected, or attempts to end a connection that may be recognized in the TCP communication protocol. The TCP status may be used for packet filtering later. The sequence number and the ACK number are automatically updated by hardware logic depending on sending and receiving the TCP packet.

The communication channel configuration register may further store setup data not shown in FIG. 4. For example, a specific communication channel configuration register stores the local port number of the communication chipset 300 or the communication apparatus 10 that may be used in TCP or UDP, and the port number of the counterpart apparatus connected through the communication channel. In addition, the communication channel configuration register further includes the IP address of the counterpart apparatus connected to the communication channel.

As shown in FIG. 4, the register map 305 may establish the local address of the communication apparatus 10, and one or more communication channels. In addition, the setup data of the register map 305 are used for filtering out received packets. This is described further below in detail.

In addition, the register map 305 may independently establish a plurality of communication channels that the communication chipset 300 may provide. For example, the communication chipset 300 in accordance with the present invention may establish eight (N=8) communication channels, and eight independent sending/receiving buffers are allocated accordingly to the TX/RX buffer 303.

Referring back to each component shown in FIG. 3, one or more PHY interfaces 317 are connected to a specified PHY chip 400 to receive physical signals in compliance with the physical layer definition from the PHY chip 400 and restore them as data. The restored physical layer data are sent to the data link module 315 with a one-to-one connection. In addition, the PHY interface 317 may receive physical layer data from the data link module 315, encode and send the data through wired or wireless media.

The plurality of data link layer 315 modules receive physical layer data from its corresponding PHY interface 317, and process the data link layer based on a specified data link layer type. For example, one data link module 315 may carry out Ethernet MAC processing, identify an MAC packet from the received data, and extract a payload from the MAC packet. Another data link module 315 may carry out ZigBee MAC processing, identify a ZigBee MAC packet from the received data, and extract a payload from the MAC packet. The other data link module 315 may carry out BT MAC processing, identify a BT MAC packet from the received data, and extract a payload from the MAC packet.

Each data link module 315 uses its corresponding address included in the register map 305 (for example, Ethernet MAC address, ZigBee MAC address, BT MAC address) to determine whether to send the physical layer data received through the PHY interface 317 to a higher layer.

In addition, each data link module 315 may be connected to a higher module (for example, first processing module 313), encode a received network layer packet as an MAC packet, and then send it to its corresponding PHY interface 317.

The first processing module 313 is connected to the plurality of data link modules 315 and filters data link data (payload of the data link packet) extracted from the plurality of data link modules 315 by using the setup data of the plurality of communication channels stored in the register map 305.

For example, the first processing module 313 determines the network layer type of the data link data. One data link module 315 (for example, Ethernet MAC module) may be of the IPv4 or IPv6 network layer type, while another data link module 315 (for example, the ZigBee MAC module or the BT MAC module) may be of the IPv6 network layer type. In addition, the Ethernet MAC module may identify the IPv4 or IPv6 type when extracting data link data, where the type data is then sent to the first processing module 313.

As described above, the first processing module 313 may determine a network layer type of the data link data by the module that extracted the data link data or by the type data received from the concerned module.

The first processing module 313 filters out data link data received from the data link module 315 by comparing the network layer type determined for the data link data with the network layer type included in all communication channel configuration registers of the register map 305.

That is, if when the network layer type of all communication channels is the same (as determined through AND or NOR), the determined network layer type of the received data link data is different from the network layer type of the communication channels, the first processing module 313 may filter out the concerned data link data and may not output the data into the downstream network layer module 311. This comparison process is carried out through a hardware comparator.

That is, if there is the same type in the network layer types of communication channels, the first processing module 313 outputs the data link data into the network layer module 311. Although data link data outputted into the network layer module 311 may be output into all network layer modules 311, it is preferred that they are outputted into a specified network layer module 311.

In addition, the first processing module 313 may filter out data link data further on the basis of the data link layer type. For example, the first processing module 313 filters out concerned data link data if when the data link layer type of all communication channels is the same, the data link module 315 for the received data link data is different. This comparison is carried out through a comparator constructed with hardware logic.

In this case, if the communication channel is not open, the data link layer type or the network layer type may be configured as null or may be detected as null by the first processing module 313. The null type is different from all types of the data link module 315 and recognized by the first processing module 313. That is, the first processing module 313 may output data into a downstream module through comparison for only the type of which the communication channel is open, and the data are filtered out if no communication channel is open although the MAC address is the same.

As described above, if all data link layer types are the same or any one of the data link layer types of the communication channels is the same type, the first processing module 313 outputs the data link data into the network layer module 311. Filtering by using data link layer types may be carried out along with filtering by using network layer types. For example, after filtering data link layer types, filtering network layer types may be carried out by the first processing module 313.

In addition, the first processing module 313 may send the network layer packets received from the network layer module 311 to a specific data link module 315.

The plurality of network layer modules 311 are connected to the first processing module 313 to receive data link data from the first processing module 313 and carry out network layer processing in compliance with a specific communication protocol.

For example, one of the network layer modules 311 are constructed to process the IPv4 communication protocol and the other network layer module 311 may process the IPv6 communication protocol of which the address system is further extended than IPv4.

The network layer module 311 that processes IPv6 carries out data processing which must be carried out in a network layer in cooperation with the network layer module 311 at an intermediate stage for adapting the data link data. For example, the IPv6 network layer module 311 is constructed to be connected to the 6LowPAN adaptation module 311 for ZigBee extension or the BT adaptation module 311 for Bluetooth extension to process adapted data link data.

In addition, the network layer module 311 may change the transport packets received from the higher second processing module 309 into network layer packets to send them to the first processing module 313.

The second processing module 309 is connected to the plurality of network layer modules 311 to filter out the network layer data (payload of the network packets) from the network layer module 311 by using the setup data of the plurality of communication channels stored in the register map 305.

Specifically, the second processing module 309 determines the transport layer type corresponding to the network layer data and compares the determined transport layer type with all transport layer types established for the communication channels to filter out network layer data or output them into a higher layer.

That is, if when the transport layer type of all communication channels is the same (through AND or NOR), the determined transport layer type of the received network layer data is different from the transport layer type of the communication channels, the second processing module 309 filters out the concerned network layer data. This comparison process is carried out by a hardware comparator.

As described above, the second processing module 309 filters out the concerned network layer data if the same transport layer type is not found, but outputs the network layer data if any.

In addition, the second processing module 309 is connected to the transport layer module 307, receives the transport packets from the transport layer module 307 and sends them to a specified network layer module 311.

The communication chipset 300 includes a plurality of transport layer modules 307, which in turn, are connected to the second processing module 309, receive the network layer data from the second processing module 309 and process specified transport layers.

For example, one transport layer module 307 (TCP module) recognizes TCP packets from the network layer data, extracts TCP data of the payload except the header and the tail in the TCP packets, outputs the TCP data into the TX/RX buffer 303 for writing it in a buffer for a specific communication channel. In addition, the TCP module 307 may write the sending and receiving state of a specific communication channel in its corresponding configuration register of the register map 305. For example, the TCP module 307 identifies communication channels by using the transport layer type, the data link layer type, the network layer type and the port number. The TCP module 307 writes status, the sequence number and the ACK number depending on receiving and sending TCP packets in the status register of the identified communication channel.

Another transport layer module 307 (UDP module) recognizes UDP packets from the network layer data, extracts, the UDP data of the payload, and outputs the UDP data into the TX/RX buffer 303 for writing it in a buffer for a specific communication channel.

The other transport layer module 307 (ICMP module) recognizes ICMP messages in the network layer data and carries out processing in accordance with the ICMP messages. For example, the transport layer module 307 may process ping messages.

A specific one of the transport layer module 307 (TCP module) may filter out the extracted transport layer data (payload of the transport packet) by using the sending/receiving status of a communication channel corresponding to the transport packet. For example, the TCP module 307 may filter out the transport layer data extracted by comparing the sequence number and the ACK number having a certain written status with the sequence number and the ACK number of the transport packet received through the network layer module 311.

As described above, each transport layer module 307 carries out processing in compliance with different standard protocols for the transport layer. In addition, each transport layer module 307 may construct and send application data of the TX/RX buffer 303 as a transport packet to the second processing module 309.

Meanwhile, the first processing module 313 may send the type data of data link data to a higher layer (for example, the network layer module 311 or transport layer module 307), and the second processing module 309 may send the type data of the network layer data to a higher layer (for example, the transport layer module 307). The type data are sent through a signal line.

The transport layer module 307 may determine whether to send the transport layer data finally extracted to the TX/RX buffer 303 or filter out (remove) the data based on the data link layer type and the network layer type.

For example, the transport layer module 307 compares the data link data type received or determined from the first processing module 313, the network layer type received or determined from the second processing module 309, and the type of the concerned transport layer module 307 with their corresponding types of communication channels. If matching communication channels are found, the transport layer module 307 writes the extracted transport layer data in the TX/RX buffer 303 or a communication channel area thereof for the concerned communication channel. If none matching communication channel is found, the transport layer data are removed.

As described above, the communication chipset 300 in accordance with the present invention hierarchically filters out packets through each layer. In particular, the process of filtering out packets is carried out by comparing the configured data with the received packet data by using the setup data of the established plurality of communication channels.

Accordingly, the communication apparatus 10 is secure from attacks on communication from the external apparatus 20 or any external apparatus 20 not connected through a communication channel. In particular, filtering out packets is carried out via hardware logic, not by using the processor 100 to protect the communication apparatus 10 including the processor. In addition, power consumption may be effectively controlled by filtering out packets for each layer. The aforementioned architecture protects the communication apparatus 10 from external random attacks or intentional attacks.

The addressing module 319 dynamically allocates one or more network layer addresses (for example, IPv4 address or IPv6 address) for the communication apparatus 10 depending on the address type of a local address configuration register.

For example, if the IPv4 address type is configured as the DHCPv4 type for automatic setup, the addressing module 319 controls the ICMP module which is a transport layer module 307 to automatically obtain and allocate (write) an address for IPv4 to the IPv4 address register.

In other cases, if the IPv6 address type is DHCPv6 or configured as automatic setup, the addressing module 319 obtains an address for IPv6 through the ICMPv6 module which may be included at network layer module 311 and allocates it to the IPv6 address register.

The communication chipset 300 in accordance with the present invention further includes the data link type determination module 321. It is not easy to know by which short-range communication a connection is made to another external apparatus 20 through a network address (for example, IP address). The data link type determination module 321 is driven if the data link layer type register of the communication channel configuration register is configured as automatic setup when establishing a communication channel, changes and set the data link type register in conformity with automatic determination of the data link layer type. For example, the data link type determination module 321 may set the data link layer type as an Ethernet, ZigBee or Bluetooth MAC type.

The data link type determination module 321 may determine the data link layer type by controlling the transport layer module 307 corresponding to the transport layer type established in a specific communication channel, the network layer module 311 corresponding to the network layer type, and the plurality of lower data link modules 315 and writes the determined data link layer type in the data link layer type register, in accordance with automatic setup of the data link type of the specific communication channel.

For example, the data link type determination module 321 controls the TCP module 307 to construct a TCP packet for establishing a TCP channel for making a TCP connection in establishing the TPC connection (by the use of the command register of the communication channel) in accordance with the automatic setup. Subsequently, the TCP packet is built as an IP packet by the IPv4 module 311, and an Ethernet packet is built by the Ethernet MAC module 315, and the Ethernet packet is sent as physical layer data of Ethernet. The response to the sent packet may be received through the Ethernet MAC module 315, the IPv4 module 311 and the TCP module 307, and sent to the data link type determination module 321. If the data link type determination module 321 receives the response through the IPv4 module 311, the data link type determination module 321 may determine the data link layer type as the Ethernet MAC type.

If a response is not received through the Ethernet MAC module 315, the data link type determination module 321 attempts to send the physical layer data and receive a response through the IPv6 module 311 and other data link modules 315 such as the ZigBee MAC module 315 or the BT MAC module 315. If the module 321 receives a response, the data link type determination module 321 may determine the data link layer type as the ZigBee MAC type or the BT MAC type.

The data link type determination module 321 may be used although a communication channel is established as the UDP type. For example, if a communication channel is the UDP type and the data link layer type is configured as automatic setup, the data link type determination module 321 automatically determines the data link layer type every time following the transport command (command register) through a concerned communication channel, and then uses the determined data link layer type to send application data of the TX/RX buffer 303.

As described above, the data link type determination module 321 may determine the data link layer type as a specific type to identify whether a data packet is sent and its response is received in the layers higher than the network layer.

The transport data control module 323 uses setup data of the communication channel to control the application data written by the processor 100 through the host interface 301 to be sent through a specific short-range communication. That is, the transport data control module 323 uses the setup data of the communication channel to send the application data through a specified short-range communication by controlling a specific transport layer module 307, a specific network layer module 311, and a specific data link module 315.

For the control by the transport data control module 323, the transport data control module 323 drives the transport layer module 307 specified depending on a transport layer type established in a communication channel for specific application data of the TX/RX buffer 303 in accordance with the transport command written in the communication channel.

The transport layer module 307 builds and outputs the application data as a transport packet. The transport data control module 323 controls the second processing module 309 to send the output transport packet to a network layer module 311 specified according to the network layer type of the communication channel, and drives the network layer module 311.

In this case, the transport data control module 323 monitors whether the transport packet sent through the transport layer module 307 is sent, and resends a specific transport packet depending on the result of monitoring.

For example, the transport data control module 323 monitors whether an ACK signal to the TCP packet sent is received. The transport data control module 323 resends the TCP packet for which an ACK signal is not received if the ACK signal is not recognized through the received TCP packet for a specified period of time established by an internal timer embedded in the communication chipset 300 and implemented with hardware logic. Resending the TCP packet by the transport data control module 323 is automatically carried out by the hardware logic with no intervention of the processor 100.

In addition, the network layer module 311 builds and outputs received transport packets as a network layer packet. The transport data control module 323 controls the first processing module 313, sends the output network layer packet to a data link module 315 specified according to the data link layer type of the communication channel and drives the concerned data link module 315.

The data link module 315 may construct and output network layer packets as a data link packet through the PHY interface 317.

As described above, the transport data control module 323 enables the application data output from the communication apparatus 10 into the external apparatus 20 to be controlled in each layer.

On the other hand, physical layer data or physical signals received from the external apparatus 20 may not be identified about whether they are data for the communication apparatus 10 until processing in higher layers (for example, the transport layer) is carried out.

However, the communication chipset 300 in accordance with the present invention is equipped with the first processing module 313 and the second processing module 309 which enable step-by-step packet filtering, and may filter out packets before processing the packets in higher layers. The first processing module 313 and the second processing module 309 are effectively constructed with hardware logic, and may hierarchically filter out data by using a comparator for comparing the type established for a communication channel with the type identified with the received data.

Figure 5:
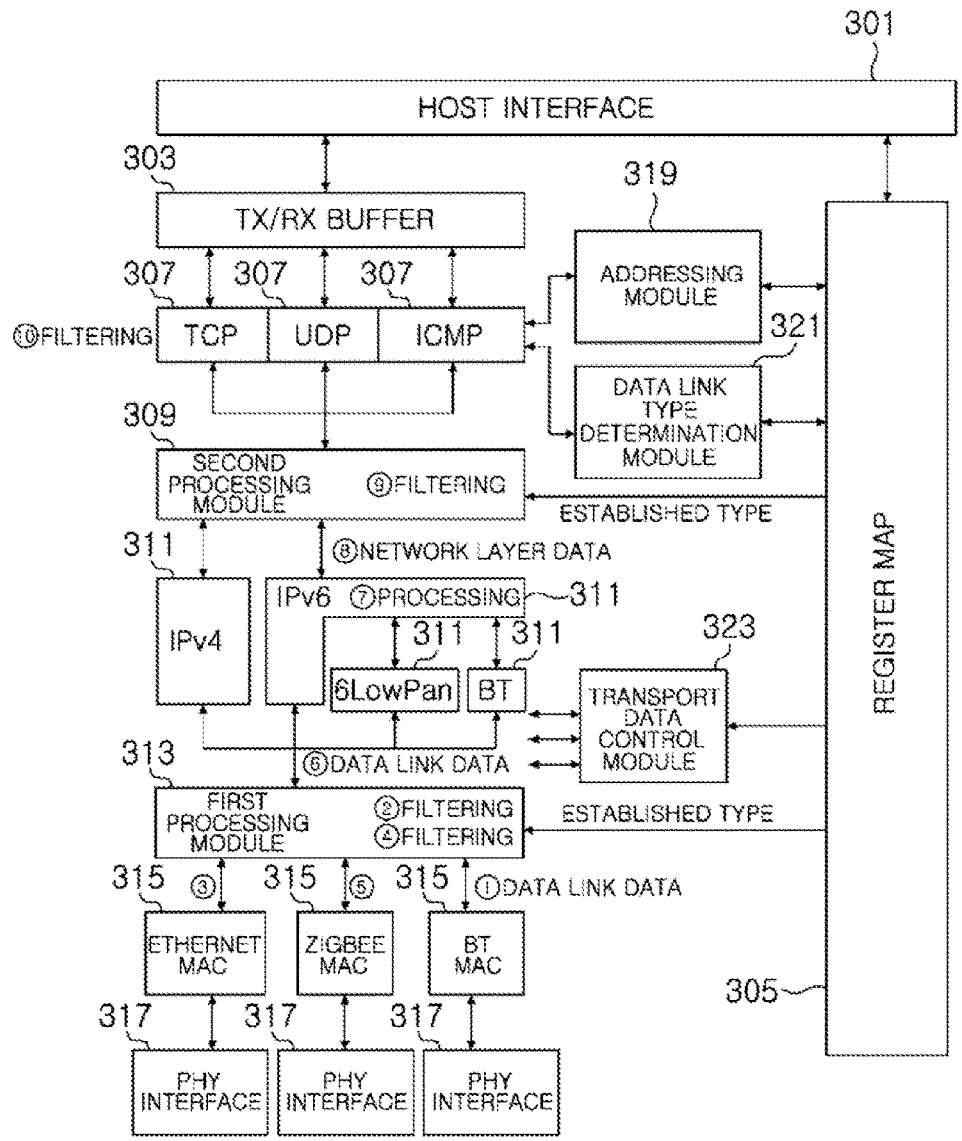
FIG. 5 shows an exemplary control flow for hierarchical filtering when receiving physical signals externally.

FIG. 5 shows an exemplary control flow for hierarchical filtering when receiving physical signals externally.

Prior to the progress of the exemplary control flow shown in FIG. 5, the processor 100 may access the register map 305 through the host interface 301 and configure a local address in the register map 305 if required. The processor 100 set two IP addresses, one of which is set as the IPv4 address and the other of which is set as the IPv6 address. As such, the communication apparatus 10 has addresses of different network layer types. In addition, the processor 100 configures addresses for three data link (or PHY) types.

The IP address and the data link type address configured as described above enables the communication apparatus 10 to implement short-range communications of different types.

In addition, the processor 100 establishes a communication channel. For example, the processor 100 establishes two communication channels through the host interface 301. It is assumed that one communication channel is established as the TCP, IPv6 and Ethernet type, and the other communication channel as the TCP, IPv6 and ZigBee type.

Subsequently, the BT MAC module 315 identifies the MAC packet with the BT MAC address of the communication apparatus 10, and extracts the payload of the MAC packet to send the extracted data link data to the first processing module 313 (see ①).

The first processing module 313 compares the data link types of the setup data of the communication channel with the extracted data link data type, and filters out the extracted data link data because they are not the same type (see ②).

Subsequently, the Ethernet MAC module 315 identifies the MAC packet with the Ethernet MAC address of the communication apparatus 10 and extracts the payload of the MAC packet to send the extracted data link data to the first processing module 313 (see ③). In addition, the Ethernet MAC module 315 may extract the IP type, and recognizes whether the IP type is IPv4 to send the type to the first processing module 313.

The first processing module 313 compares the data link type of the communication channels with the extracted data type to know whether they are the same. In addition, the first processing module 313 compares the network layer type of the communication channel with the network layer type determined through the Ethernet. In addition, if the comparison reveals that the network layer types are different, the data link data from the Ethernet MAC module 315 is removed (filtered out) (see ④).

Subsequently, the ZigBee MAC module 315 identifies the MAC packet with the ZigBee MAC address of the communication apparatus 10, extracts the payload of the MAC packet and sends the extracted data link data to the first processing module 313 (see ⑤).

The first processing module 313 compares the data link types to know whether there are the same data link types, and the network layer types to know whether there are the same network layer types to output the data link data (see ⑥). The data link data are outputted into a specified network layer module 311 or all network layer modules 311. The first processing module 313 may output an indexes or a data link layer type indicating the ZigBee MAC module 315.

The data link data are sent to the 6LowPAN adaptation module 311 which extends the data to IPv6 packets and sends them to the IPv6 processing module 311. The IPv6 processing module 311 processes the data in compliance with the IPv6 communication protocol and extracts the payload thereof (see ⑦).

The IPv6 processing module sends the extracted payload as network layer data to the second processing module 309 (see ⑧).

The second processing module 309 determines the transport layer type for the network layer data. The second processing module 309 may determine the transport layer type as UDP.

The second processing module 309 may compare the transport layer types of the established communication channels with the determined transport layer type to determine the same type is not found. Accordingly, the second processing module 309 filters out the network layer data to avoid processing in higher layers (see ⑨).

If the same transport layer type is found, the concerned network layer data may be sent to a specific module 307 of the higher layer (transport layer) for further processing. The module 307 of the higher layer may use setup data of the register map 305 (types or port numbers) to know whether they are data for a specific communication channel. In other cases, the module 307 may use the status of the communication channel configuration register to filter out data (see ⑩).

For example, the TCP module 307 builds a TCP packet with the received one or more network layer data. Subsequently, the TCP module 307 is constructed to use the status and setup data stored in the configuration register to filter out (remove) the built TCP packet.

As exemplary filtering, the module 307 extracts a source port number from the header of the built TCP packet and determines an IP address of a counterpart apparatus that sends the TCP packet. The IP address may be received from the second processing module 309 or the network layer module 311, or configured. The TCP module 307 compares the counterpart IP address and the source port number with the counterpart apparatus IP address and the counterpart apparatus port number included in the communication channel configuration register of the communication channel. If both of them do not match, the module 307 filters out the concerned TCP packet.

The IP address and the source port number that are extracted or determined are compared with the IP address and the port number of the counterpart apparatus established for all communication channels. By comparing the IP addresses and the port numbers, the TCP module 307 may specify a communication channel. As described above, the TCP module 307 may use at least the IP addresses and the port numbers to specify one communication channel, and delete a concerned TCP packet if it is not specified.

Subsequently, the TCP module 307 further uses a specified communication channel configuration register to filter out the TCP packet after specifying the communication channel.

As exemplary filtering after specifying a communication channel, the TCP module 307 identifies whether the destination port number extracted from the TCP packet header is the same as the local port number of the specified communication channel configuration register. If they are not the same, the TCP module 307 does not send the concerned TCP packet to the TX/RX buffer 303 allocated to the communication channel and deletes it.

In addition, the TCP module 307 may use the status of communication channel connection (identified through the status register of the communication channel configuration register) to further filter out TCP packets. As exemplary packet filtering by using the status of connection, the TCP module 307 extracts the flag of the TCP packet header to identify whether the SYN flag is set while attempting connection. The TCP packet of which the SYN flag is not set is filtered out by the TCP module 307.

While attempting connection or in disconnection, the TCP module 307 may identify whether there are data in the built TCP packet to be received. The TCP data packet including the data is filtered out by the TCP module 307.

While attempting disconnection, the TCP module 307 extracts the flag of the TCP packet header, and checks whether the FIN flag is set. The TCP packet of which the FIN flag is not set is filtered out by the TCP module 307.

In addition, the TCP module 307 may further use the sequence number and the ACK number included in the status register to further filter out the TCP packet.

As exemplary filtering by using a sequence number and an ACK number, the TCP module 307 deletes the concerned TCP packet if the sequence number of the built TCP packet is different from the ACK number managed and sent by the status register.

In addition, the TCP module 307 deletes the concerned TCP packet if the sequence number of the built TCP packet corresponds to the TCP packet already received. That is, the TCP module 307 compares the sequence number of the status register of a specified communication channel with the sequence number of the built TCP packet to delete the concerned TCP packet if the constructed sequence number is smaller than the sequence number of the status register.

In addition, the TCP module 307 may determine the payload size of the built TCP packet by using the TCP packet header. If the payload size is greater than the buffer size of a communication channel allocated to the TX/RX buffer 303, the TCP module 307 deletes the concerned TCP packet.

In addition, the UDP module 307 may filter out the UDP packet by using the setup data or status. For example, the UDP module 307 may filter out the concerned UDP packet by comparing the source port number, the destination port number and the port number stored in the communication channel configuration register.

The payload data of the TCP packet not filtered out is extracted by the transport layer module 307, and the extracted payload data are written in the buffer 303 allocated to a specific communication channel. Subsequently, the processor 100 may recognize the payload data written in the TX/RX buffer 303, and read in the payload data which are application data.

As described above, the transport layer module 307 filters out packets by using the setup data and the status data. In particular, the transport layer module 307 is constructed to send only the packet corresponding with the setup data and the status data established with respect to a communication channel to the processor 100. Accordingly, unlike other software solutions, the present invention may tackle Internet attacks made by various external apparatuses, for example, flooding attacks, sequence number modification attacks or random attacks.

In particular, since the communication chipset 300 including the transport layer module 307 is constructed with hardware logic, the communication chipset 300 and the communication apparatus 10 of the present invention are constructed to be further secure from Internet attacks.

As known from the aforementioned examples, the communication chipset 300 in accordance with the present invention may carry out step-by-step packet filtering before sending data packets to the processor 100 although it receives unspecified data packets, thereby protecting the communication apparatus 10.

In particular, the communication apparatus 10 may be constructed to support various types of communication channels and filter out packets between layers by using established types for the various types of communication channels. In addition, all modules of the communication chipset 300 may be constructed with a dedicated hardware logic, and filter out packets of layers not connected or unspecified before access to the packets by the processor 100 through the host interface 301.

Accordingly, the communication chipset 300 may protect the communication apparatus 10 against external attacks on communication, process data through a specified communication channel, and implement high-speed data communication processing by hardware.

As described above, since the communication chipset 300 implemented with dedicated hardware logic does not provide an environment in which attackers are able to execute codes, it may fundamentally tackle attacker's intrusion to break security through the Internet.

While the present invention has been shown and described, the present invention is not limited to the aforementioned description and accompanying drawings. It will be understood by those skilled in the art that various substitutions, changes and modifications may be made without departing from the scope of the present invention as defined in the following claims.

What is claimed is:

1. A communication chipset, comprising:
   a register map store setup data for establishing a plurality of communication channels, the register map being accessible by a hardware processor and the setup data including first setup data and second setup data;
   a first data link module configured to send/receive physical layer data and process a data link layer in accordance with a first data link layer type;
   a second data link module configured to send/receive physical layer data and process a data link layer in accordance with a second data link layer type;
   a first processing module connected to the first data link module and the second data link module, the first processing module being configured to use the first setup data of the plurality of communication channels stored in the register map, to filter out data link data from the first data link module by using the first setup data and to filter out data link data from the second data link module by using the first setup data;
   a first network layer module configured to receive data link data outputted by the first processing module and process a specified network layer;
   a second network layer module configured to receive data link data outputted by the first processing module and process a network layer different from the first network layer module; and
   a second processing module connected to the first network layer module and the second network layer module, the second processing module being configured to use the second setup data of the plurality of communication channels stored in the register map, wherein in response to detection of the data link data being processed by the first network module, the second processing module configured to filter out network layer data from the first network layer module by using the second setup data and in response to the detection of the data link data being processed by the second network module, the second processing module configured to filter out network layer data from the second network layer module by using the second setup data.

2. The communication chipset of claim 1, wherein the register map comprises a plurality of communication channel configuration registers for establishing the plurality of communication channels, and the communication channel configuration registers comprise a network layer type and a data link layer type indicating the first data link layer type or the second data link layer type; and
   the first processing module is configured to filter out or output the data link data from the first data link module and to filter out or output the data link data from the second data link module on the basis of comparison of the network layer type corresponding to the data link data with a plurality of network layer types.

3. The communication chipset of claim 2, wherein the first processing module is configured to filter out or output the data link data from the first data link module further on the basis of comparison of the type of the first data link module with a plurality of data link layer types.

4. The communication chipset of claim 1, wherein the register map comprises a plurality of communication channel configuration registers for establishing a plurality of communication channels, and the communication channel configuration registers comprise a transport layer type; and
   the second processing module is configured to filter out or output the network layer data on the basis of comparison of the transport layer type corresponding to the network layer data with a plurality of transport layer types of the plurality of communication channel configuration registers.

5. The communication chipset of claim 1, further comprising:
   a first transport layer module configured to receive network layer data outputted by the second processing module and processing a specified transport layer; and
   a second transport layer module configured to receive network layer data outputted by the second processing module and processing a transport layer different from the first transport layer module,
   wherein the first transport layer module is configured to filter out the processed transport layer data by using sending/receiving status of a connected communication channel.

6. The communication chipset of claim 1, further comprising:
   a data link type determination module configured to determine a data link layer type of a communication channel to be connected,
   wherein the register map comprises a plurality of communication channel configuration registers for establishing a plurality of communication channels, and the communication channel configuration registers comprise a data link layer type indicating the first data link layer type or the second data link layer type, or requesting automatic selection of one from the first data link layer type or the second data link layer type;
   the data link type determination module is configured to determine the data link layer type as the first data link layer type by sending physical layer data and receiving a response thereto through the first data link module, or determine the data link layer type as the second data link layer type by sending physical layer data and receiving a response thereto through the second data link module, in accordance with the setting of the data link layer type requesting automatic selection; and the data link type determination module is configured to determine the data link layer type as the first data link layer type or the second data link layer type by sending a data packet and receiving a response thereto in a layer above the network layer.

7. The communication chipset of claim 1, further comprising an addressing module configured to allocate one or more network layer addresses of an apparatus in which the communication chipset is equipped, wherein the register map comprises a first address register for storing a first network layer address of the apparatus, a second address register for storing a second network layer address, a first address type register for configuring the type of the first network layer address, and a second address type register for configuring the type of the second network layer address type; and the addressing module is configured to automatically allocate the first network layer address to the first address register in accordance with the setup data of the first address type register, and automatically allocate the second network layer address to the second address register in accordance with the setup data of the second address type register.

8. A communication apparatus, comprising:

a communication chipset including at least one or more modules being configured and executed by a hardware processor, the one or more modules comprising:

a register map configured to store setup data for establishing a plurality of communication channels, the register map being accessible by the hardware processor and the setup data including first setup data and second setup data;

a first data link module configured to send/receive physical layer data and process a data link layer in accordance with a first data link layer type;

a second data link module configured to send/receive physical layer data and process a data link layer in accordance with a second data link layer type;

a first processing module connected to the first data link module and the second data link module, the first processing module being configured to use the first setup data of the plurality of communication channels stored in the register map, to filter out data link data from the first data link module by using the first setup data and to filter out data link data from the second data link module by using the first setup data;

a first network layer module configured to receive data link data outputted by the first processing module and process a specified network layer;

a second network layer module configured to receive data link data outputted by the first processing module and process a network layer different from the first network layer module; and a second processing module connected to the first network layer module and the second network layer module, the second processing module being configured to use the second setup data of the plurality of communication channels stored in the register map, wherein in response to detection of the data link data being processed by the first network module, the second processing module configured to filter out network layer data from the first network layer module by using the second setup data and in response to the detection of the data link data being processed by the second network module, the second processing module configured to filter out network layer data from the second network layer module by using the second setup data, and the hardware processor is further configured to send and receive data in an application layer through the communication chipset.

* * * * *